US012803862B2

(12) United States Patent
Green et al.

(10) Patent No.: US 12,803,862 B2
(45) Date of Patent: *Nov. 17, 2026

(54) ALERTING NETWORKED DEVICES OF SIGNAL DIVERGENCE BY GEOREGION

(71) Applicant: Truist Bank, Charlotte, NC (US)

(72) Inventors: Kevin Green, Matthews, NC (US); Raphael Fitzgerald, Winston-Salem, NC (US); Paul Gerard Mistor, Winston-Salem, NC (US)

(73) Assignee: TRUIST BANK, Charlotte, NC (US)

( * ) Notice: Subject to any disclaimer, the term of this patent is extended or adjusted under 35 U.S.C. 154(b) by 113 days.

This patent is subject to a terminal disclaimer.

(21) Appl. No.: 19/083,643

(22) Filed: Mar. 19, 2025

(65) Prior Publication Data

US 2025/0219891 A1 Jul. 3, 2025

Related U.S. Application Data

(63) Continuation of application No. 18/498,808, filed on Oct. 31, 2023, now Pat. No. 12,284,070, which is a continuation of application No. 17/662,878, filed on May 11, 2022, now Pat. No. 11,838,170.

(51) Int. Cl.

| | |
|---|---|
| ***H04L 41/0604*** | (2022.01) |
| ***H04L 41/16*** | (2022.01) |
| ***H04L 43/08*** | (2022.01) |

(52) U.S. Cl.

CPC ...... *H04L 41/0618* (2013.01); *H04L 41/0622* (2013.01); *H04L 41/16* (2013.01); *H04L 43/08* (2013.01)

(58) Field of Classification Search

CPC . H04L 41/0618; H04L 41/0622; H04L 41/16; H04L 43/08

USPC .......................................................... 709/224

See application file for complete search history.

(56) References Cited

U.S. PATENT DOCUMENTS

| | | | | |
|---|---|---|---|---|
| 10,609,435 | B1 * | 3/2020 | Coffman | H04N 21/2665 |
| 11,010,787 | B1 * | 5/2021 | Tietzen | G06Q 30/0246 |
| 11,062,327 | B2 | 7/2021 | Biswas | |
| 11,803,917 | B1 | 10/2023 | Geng | |
| 2011/0022541 | A1 | 1/2011 | Miles | |
| 2011/0208562 | A1 * | 8/2011 | Hartley | G06Q 30/02 715/764 |

(Continued)

*Primary Examiner* — Karen C Tang

(74) *Attorney, Agent, or Firm* — Michael A. Springs, Esq.; Shumaker, Loop & Kendrick, LLP; Patrick B. Horne

(57) ABSTRACT

A system for monitoring quantized signals in a bidirectional data stream and alerting a networked device of metric divergence by georegion includes a computing system that automatically, for each of multiple user entities, receives input signals and stores corresponding records, associated with the user entity, each representing a quantized input event. The computing system increments a resource of the user entity by a respective input quantity. Georegion-specific attributes associated with a respective georegion are discriminated, and the input records are associated with georegion. The computing system measures user-specific georegion-specific metrics for each georegion and determines whether the metrics diverge from a georegion-specific index. An alert is sent across a network for display on a user device upon determining a user-specific georegion-specific metric diverges from a georegion-specific index.

20 Claims, 8 Drawing Sheets

(56) References Cited

U.S. PATENT DOCUMENTS

| | | | | |
|---|---|---|---|---|
| 2017/0011377 | A1 | 1/2017 | Stone | |
| 2017/0337636 | A1 | 11/2017 | Fuzaylova | |
| 2018/0101914 | A1 | 4/2018 | Samuel | |
| 2019/0043063 | A1 * | 2/2019 | Johnsen | G06Q 30/0201 |
| 2019/0287183 | A1 | 9/2019 | Bishnoi | |
| 2020/0043040 | A1 | 2/2020 | Mannix | |
| 2020/0074359 | A1 | 3/2020 | Subramanian | |
| 2020/0394721 | A1 | 12/2020 | Gonzalez | |
| 2021/0200943 | A1 * | 7/2021 | Aviyam | G06F 16/953 |
| 2021/0287301 | A1 | 9/2021 | Young | |
| 2022/0114676 | A1 | 4/2022 | Verma | |
| 2022/0292543 | A1 * | 9/2022 | Henderson | G06Q 30/0252 |
| 2022/0414790 | A1 | 12/2022 | Parker | |
| 2023/0153635 | A1 | 5/2023 | Chaudhary | |
| 2023/0316419 | A1 | 10/2023 | Bishnoi | |
| 2024/0232889 | A1 | 7/2024 | Skalski | |

* cited by examiner

ALERTING NETWORKED DEVICES OF SIGNAL DIVERGENCE BY GEOREGION

CROSS-REFERENCE TO RELATED APPLICATIONS

This application is a continuation, and claims the benefit of priority of U.S. non-provisional patent application Ser. No. 18/498,808, titled "Alerting Networked Devices of Signal Divergence by Georegion" filed on Oct. 31, 2023, which is a continuation of U.S. non-provisional patent application Ser. No. 17/662,878, titled "Messaging Segmentation Based on Data Flow Informatics" filed on May 11, 2022, now U.S. Pat. No. 11,838,170 issued Nov. 15, 2023, both of which are incorporated herein in their entireties by this reference.

FIELD

This invention pertains generally to systems for monitoring event signals, and more particularly to automated alerts when incoming signal activity falls below an index.

BACKGROUND

Many user entities are unaware of high-level patterns in their data flows. Conventional paper flow handling of information and resources has been largely replaced by use of computerized data storage and digital transactions. This opens opportunities for informatics previously unavailable, particularly for example through machine learning and artificial intelligence (AI).

User entities may or may not be aware of what georegions are significant in their transactional flows. Where some awareness is present, metrics for quantizing whether particular georegions are underutilized are not readily available. User-entities are not generally aware of whether their activity patterns diverge from that of their peers because transactional automated analytical tools are not generally available. User entities may be disadvantaged by the proprietary and private handling of incoming payments for goods and services, leaving users in a common industry and/or area unaware of whether their revenues meet their own expectations or are on par or average with peer-representative levels. Lack of such information may prevent users from effectively penetrating market areas. Resources can be wasted with target messaging toward saturated marked areas.

User entities disseminate promotional information to wide audiences, sometimes inadvertently sending redundant information to potential customers and even existing customers. Some consumers feel inundated with poorly targeted and unrestrained marketing and messaging. The associated data traffic is a burden on wireless service providers and network operators.

Improvements are needed toward utilizing transactional data flows and records to alert user entities to divergence between metrics related to their activity in a georegion and their own expectations, or between their metrics and that of peers.

BRIEF SUMMARY

Embodiments of the present invention address the above needs and/or achieve other advantages by providing a system for monitoring quantized signals in a bidirectional data stream and alerting a networked device of metric divergence by georegion, the system including a computing system including one or more processor and at least one of a memory device and a non-transitory storage device. The one or more processor executes computer-readable instructions. A network connection operatively connects user devices to the computing system. Upon execution of the computer-readable instructions, the computing system automatically performs steps, for each specific user entity of multiple user entities.

The steps include receiving input event signals and storing corresponding input event records associated with the specific user entity, each of the input event records representing a respective quantized input event. The computing system increments, for at least some of the input event records, one or more quantized resource of the specific user entity by a respective input quantity.

The computing system receives output event signals and storing corresponding output event records associated with the specific user entity, each of the output event records representing a respective quantized output event. The computing system decrements, for at least some of the output event records, a respective output quantity from the one or more quantized resource of the specific user entity.

The computing system discriminates, for at least some of the input event records, a respective at least one georegion-specific attribute associated with a respective georegion. The computing system associates each input event record, for which a respective at least one georegion-specific attribute is discriminated, with the respective georegion. The computing system measures over a time interval, for each georegion with which input event records of the specific user-entity are associated, a user-specific georegion-specific metric.

The computing system determines, for each georegion for which a user-specific georegion-specific metric is measured, whether the user-specific georegion-specific metric diverges from a georegion-specific index. The computing system sends an alert across the network connection for display at least in part on at least one user device associated with the specific user entity upon determining the user-specific georegion-specific metric diverges from the georegion-specific index.

In some examples, the computing system aggregates over time, for at least one georegion with which input event records of multiple user-entities are associated, the georegion-specific index.

Aggregating over time the georegion-specific index may include using an aggregating algorithm trained by a machine-learning technique.

The aggregating algorithm in some examples aggregates the georegion-specific index from the input event records of the multiple user-entities from at least one time period preceding said time interval.

Discriminating the respective at least one georegion-specific attribute may include using a discriminating algorithm trained by a machine-learning technique.

The machine-learning technique may utilize input event records of multiple user-entities from at least one time period preceding said time interval to train the discriminating algorithm to discriminate georegion-specific attributes.

In some examples, the machine-learning technique utilizes input event records of the specific user entity from multiple time periods preceding said time interval to train the discriminating algorithm to discriminate georegion-specific attributes.

The georegion-specific index may represent at least one of: an average; a mean; a normalized sum; and a weighted sum.

In some examples, the computing system determines the georegion-specific index at least in part using third-party data.

The user-specific georegion-specific metric may represent at least one of: an average; a mean; a normalized sum; and a weighted sum.

The alert may include an indication that the user-specific georegion-specific metric diverges from the georegion-specific index by subceeding the georegion-specific index.

In at least one embodiment, a system is provided for monitoring quantized signals in a bidirectional data stream and alerting a networked device of metric divergence by georegion. The system includes a computing system including one or more processor and at least one of a memory device and a non-transitory storage device. The one or more processor executes computer-readable instructions. A network connection operatively connects user devices to the computing system. Upon execution of the computer-readable instructions, the computing system performs steps, for a specific user entity, including: receiving input event signals and storing corresponding timestamped input event records associated with the specific user entity, each of the timestamped input event records representing a respective quantized input event; incrementing, for at least some of the timestamped input event records, one or more quantized resource of the specific user entity by a respective input quantity; receiving output event signals and storing corresponding timestamped output event records associated with the specific user entity, each of the timestamped output event records representing a respective quantized output event; decrementing, for at least some of the timestamped output event records, a respective output quantity from the one or more quantized resource of the specific user entity; discriminating, for at least some of the timestamped input event records, a respective at least one georegion-specific attribute associated with a respective georegion; associating each timestamped input event record, for which a respective at least one georegion-specific attribute is discriminated, with the respective georegion; measuring for a first time interval, for each georegion with which timestamped input event records of the user-entity are associated and timestamped within the first time interval, a respective georegion-specific metric; measuring, for each georegion for which a georegion-specific metric is measured, a georegion-specific index, wherein the georegion-specific index is at least one of representative of timestamped input event records of the user entity within a second time interval preceding at least in part the first time interval, and representative of timestamped input event records of other user entities; determining, for each georegion for which a georegion-specific metric is measured, whether the georegion-specific metric diverges from the georegion-specific index; and sending an alert across the network connection for display at least in part on at least one user device associated with the user entity upon determining the georegion-specific metric subceeds the georegion-specific index.

In at least one example, the georegion-specific index is representative of timestamped input event records of the user entity within the second time interval, and representative of timestamped input event records of multiple other user entities within the second time interval.

The computing system may aggregate over time the georegion-specific index using an aggregating algorithm trained by a machine-learning technique.

The machine-learning technique in at least one example utilizes records of the multiple other user entities such that the georegion-specific index is at least in part peer representative.

In at least one embodiment, a method is provided for a computing system to monitor quantized signals in a bidirectional data stream and alert a networked device of metric divergence by georegion. The computing system includes one or more processor and at least one of a memory device and a non-transitory storage device. The one or more processor is configured to execute computer-readable instructions. The method includes, upon execution of the computer-readable instructions, for each specific user entity of multiple user entities: receiving input event signals and storing corresponding timestamped input event records associated with the specific user entity, each of the timestamped input event records representing a respective quantized input event; incrementing, for at least some of the timestamped input event records, one or more quantized resource of the specific user entity by a respective input quantity; receiving output event signals and storing corresponding timestamped output event records associated with the specific user entity, each of the timestamped output event records representing a respective quantized output event; decrementing, for at least some of the timestamped output event records, a respective output quantity from the one or more quantized resource of the specific user entity; discriminating, for at least some of the timestamped input event records, a respective at least one georegion-specific attribute associated with a respective georegion; associating each timestamped input event record, for which a respective at least one georegion-specific attribute is discriminated, with the respective georegion; measuring for a first time interval, for each georegion with which timestamped input event records of the specific user-entity are associated and timestamped within the first time interval, a respective georegion-specific metric; measuring, for each georegion for which a georegion-specific metric is measured, a georegion-specific index, wherein the georegion-specific index is at least one of representative of timestamped input event records of the specific user entity within a second time interval preceding at least in part the first time interval, and representative of timestamped input event records of other user entities; determining, for each georegion for which a georegion-specific metric is measured, whether the georegion-specific metric diverges from the georegion-specific index; and sending an alert across the network connection for display at least in part on at least one user device associated with the specific user entity upon determining the georegion-specific metric subceeds the georegion-specific index.

The georegion-specific index may be representative of timestamped input event records of the user entity within the second time interval, and representative of timestamped input event records of multiple other user entities within the second time interval.

The computing system may aggregate over time the georegion-specific index using an aggregating algorithm trained by a machine-learning technique.

In at least one example, the machine-learning technique utilizes records of the multiple other user entities such that the georegion-specific index is at least in part peer representative.

In at least one example, the georegion-specific index represents at least one of: an average; a mean; a normalized sum; and a weighted sum.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
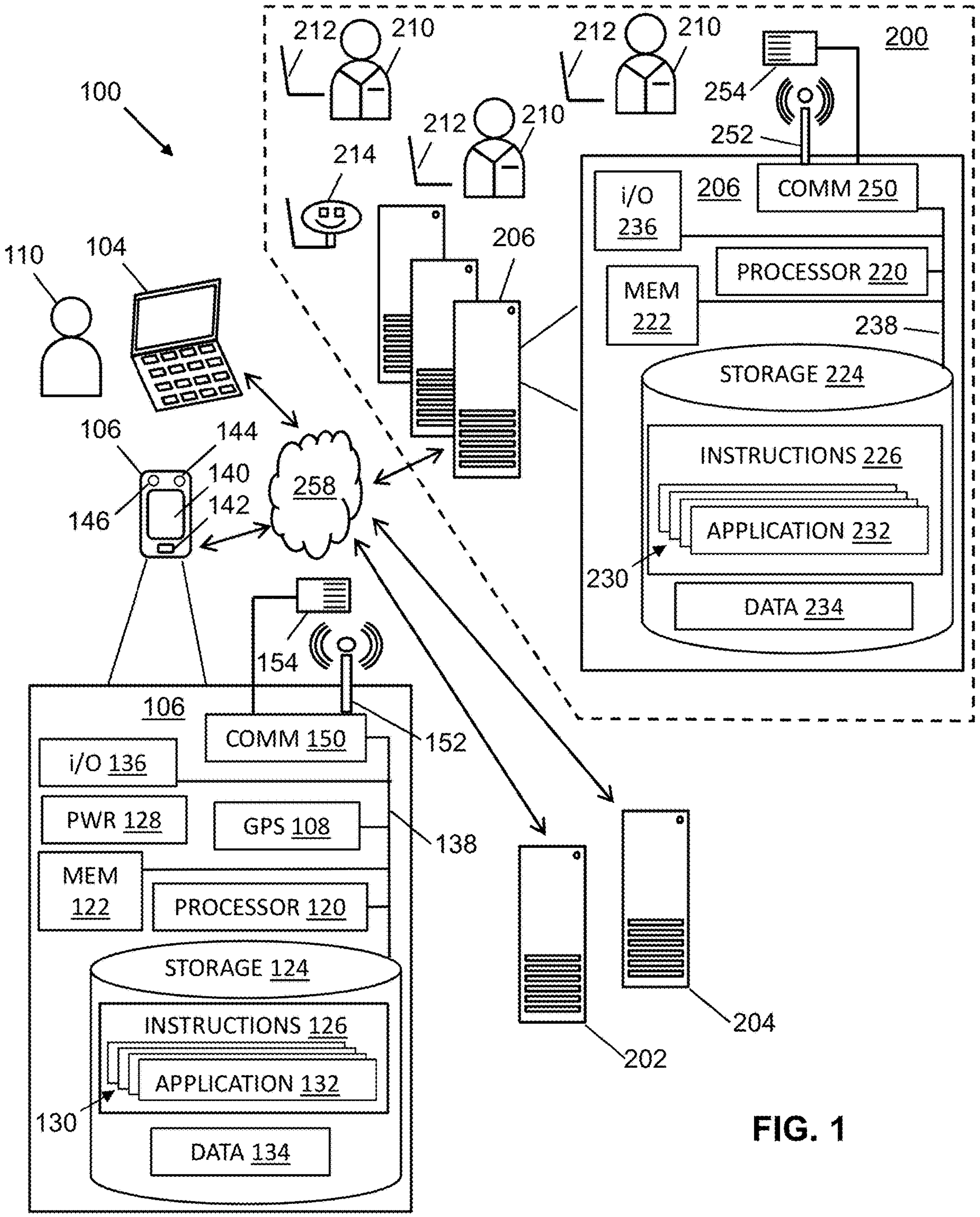

Having thus described embodiments of the invention in general terms, reference will now be made to the accompanying drawings, wherein:

FIG. 1 illustrates an enterprise system, and environment thereof, according to at least one embodiment.

Figure 2A:
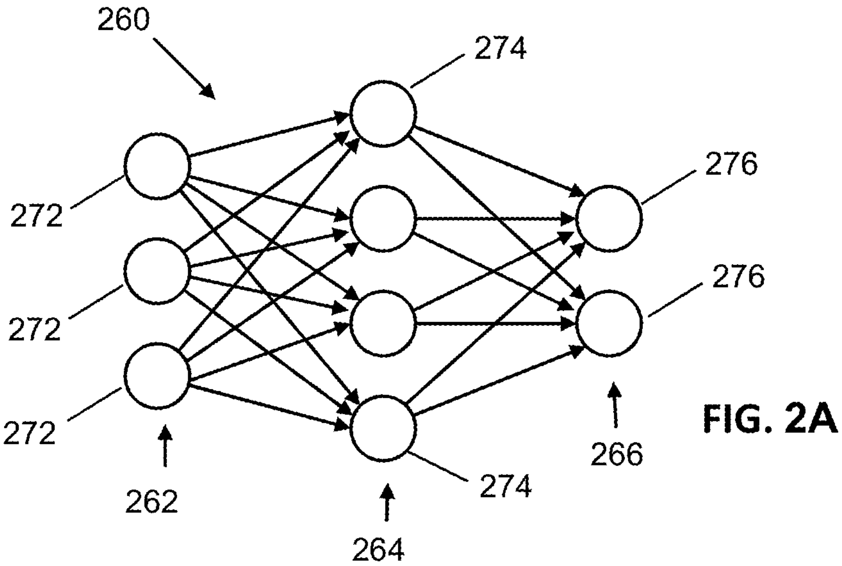
Figure 2B:
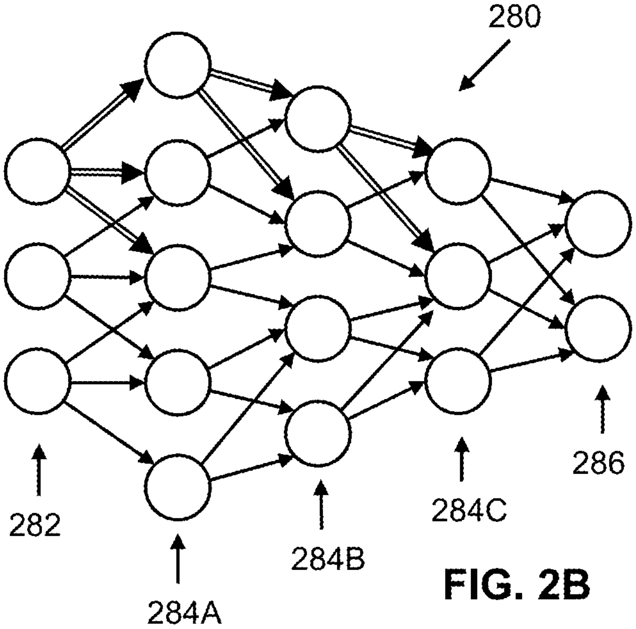

FIG. 2A is a diagram of a feedforward network, according to at least one embodiment, utilized in machine learning FIG. 2B is a diagram of a convolutional neural network (CNN), according to at least one embodiment, utilized in machine learning.

Figure 2C:
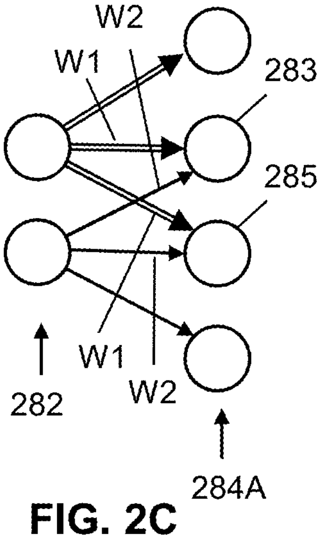

FIG. 2C is a diagram of a portion of the convolutional neural network of FIG. 2B, according to at least one embodiment, illustrating assigned weights at connections or neurons.

Figure 3:
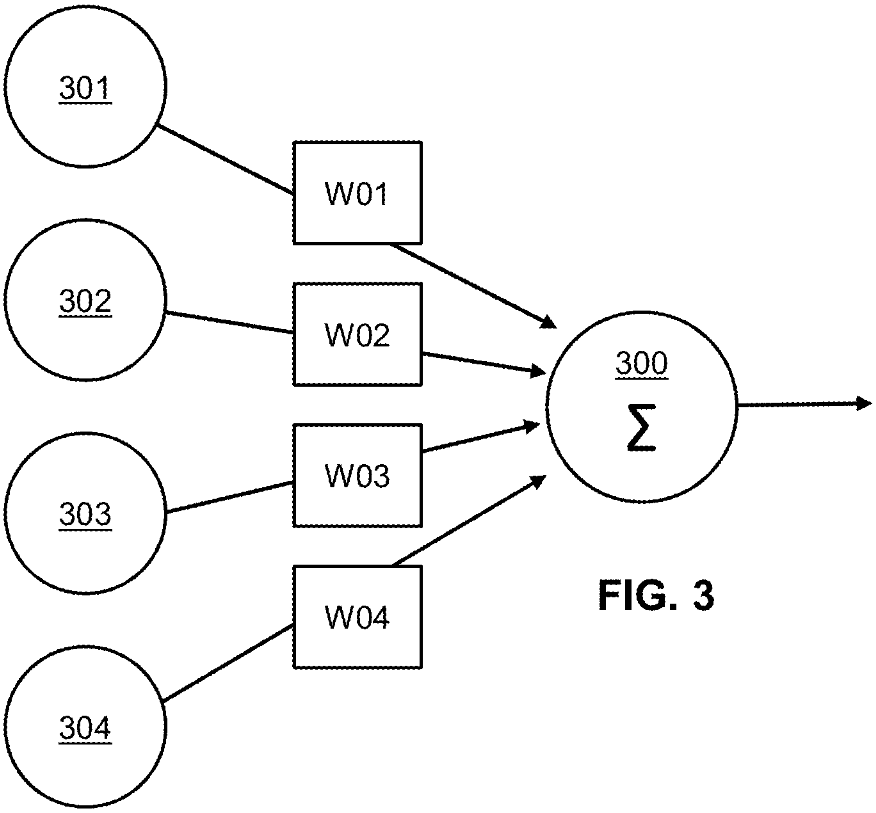

FIG. 3 is a diagram representing an exemplary weighted sum computation in a node in an artificial neural network.

Figure 4:
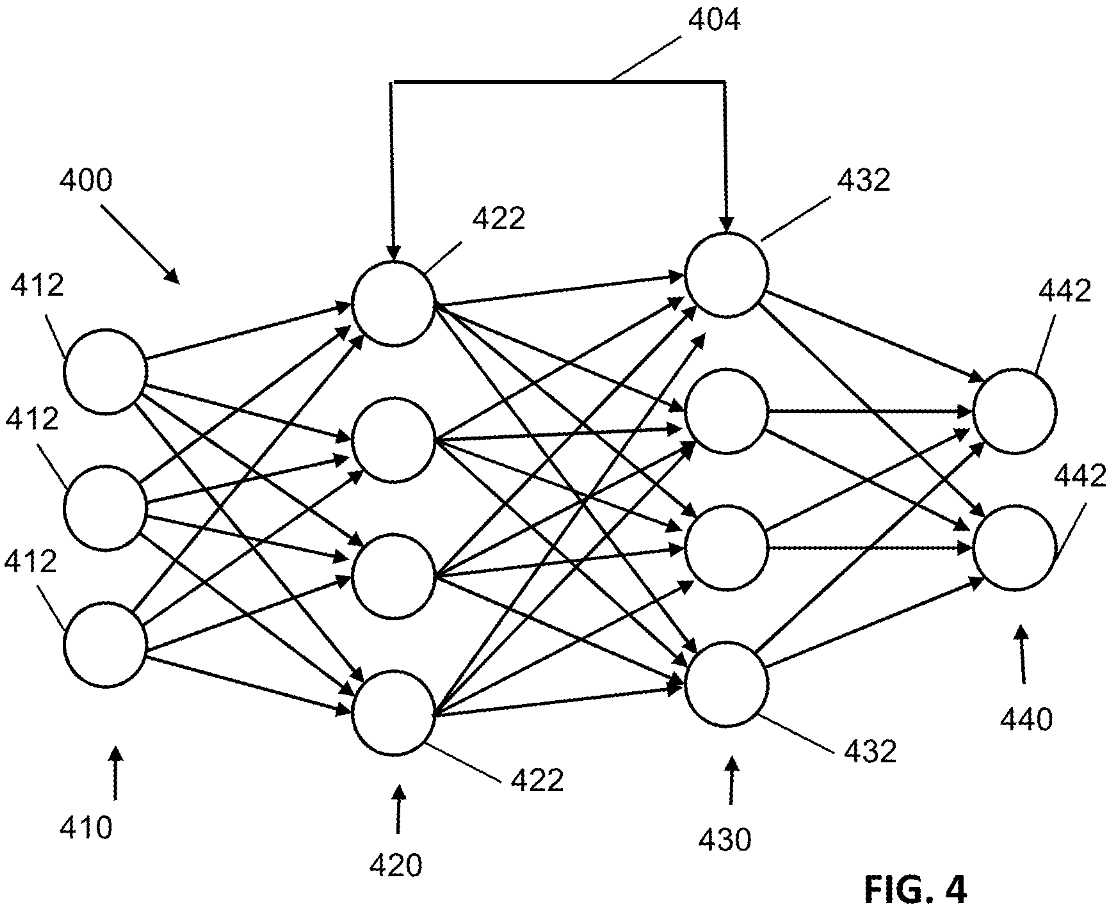

FIG. 4 is a diagram of a Recurrent Neural Network RNN, according to at least one embodiment, utilized in machine learning.

Figure 5:
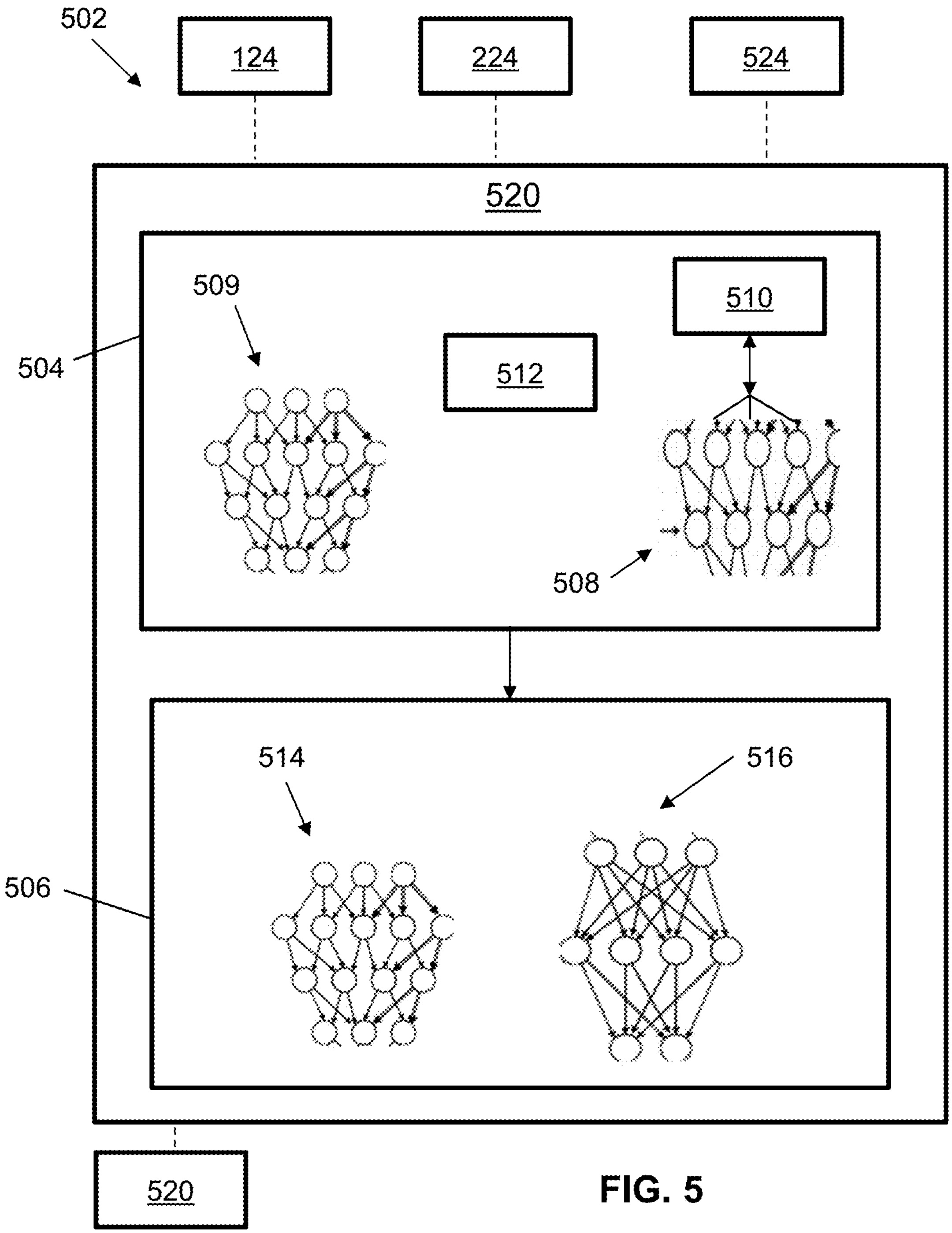

FIG. 5 is a schematic logic diagram of an artificial intelligence program including a front-end and a back-end algorithm.

Figure 6:
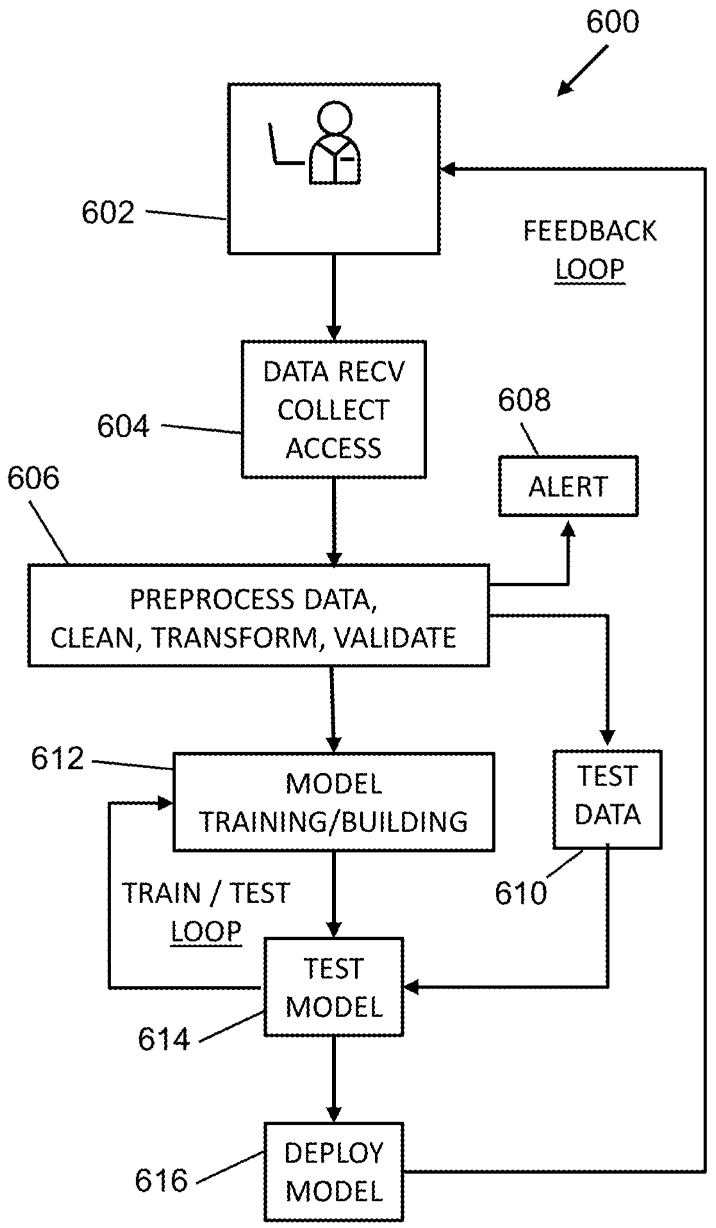

FIG. 6 is a flow chart representing a method, according to at least one embodiment, of model development and deployment by machine learning.

Figure 7:
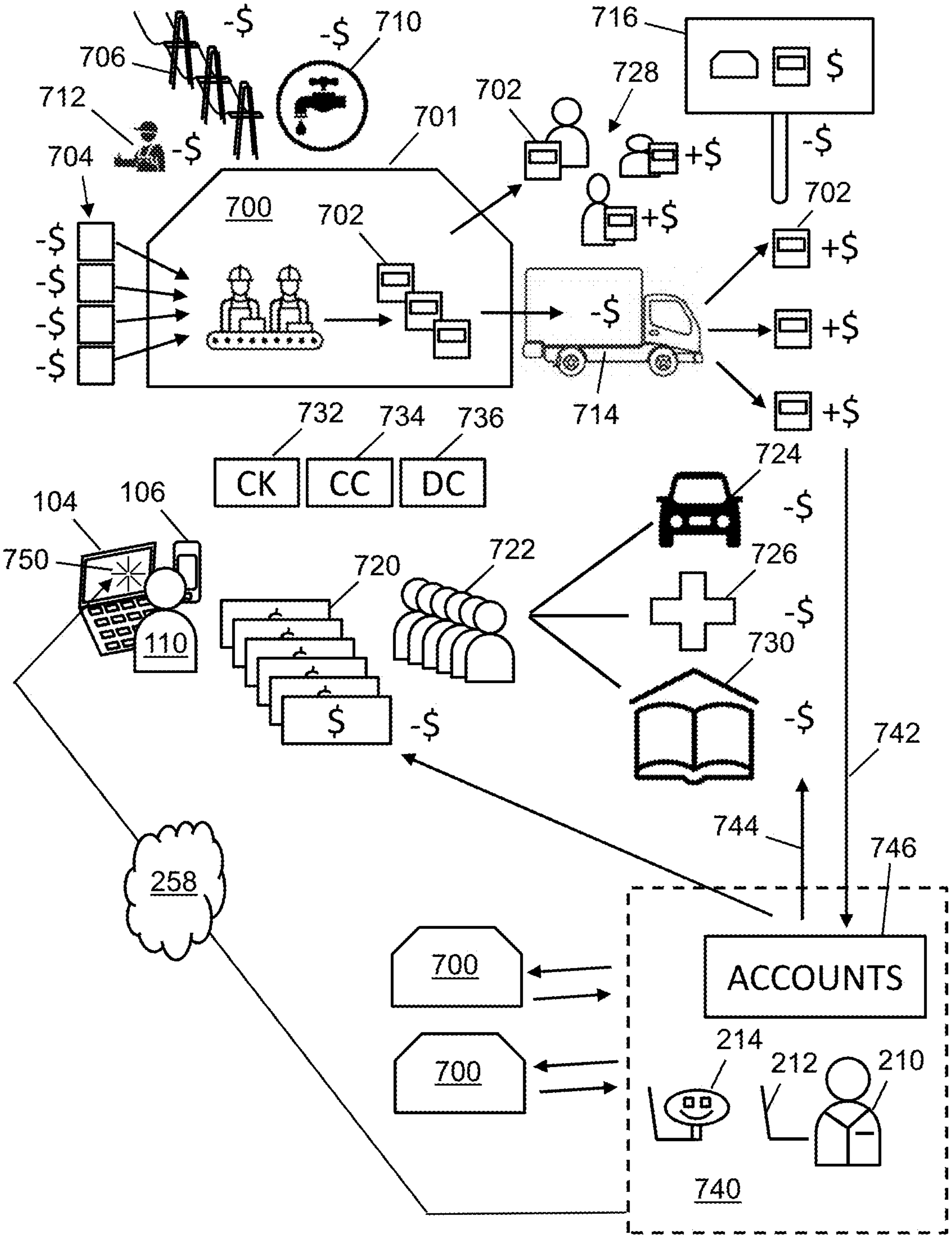

FIG. 7 represents an implementation of systems and methods for detecting whether a user-specific georegion-specific metric diverges from a georegion-specific index, and upon detecting such divergence, automatically sending an alert for display at least in part on user device.

Figure 8:
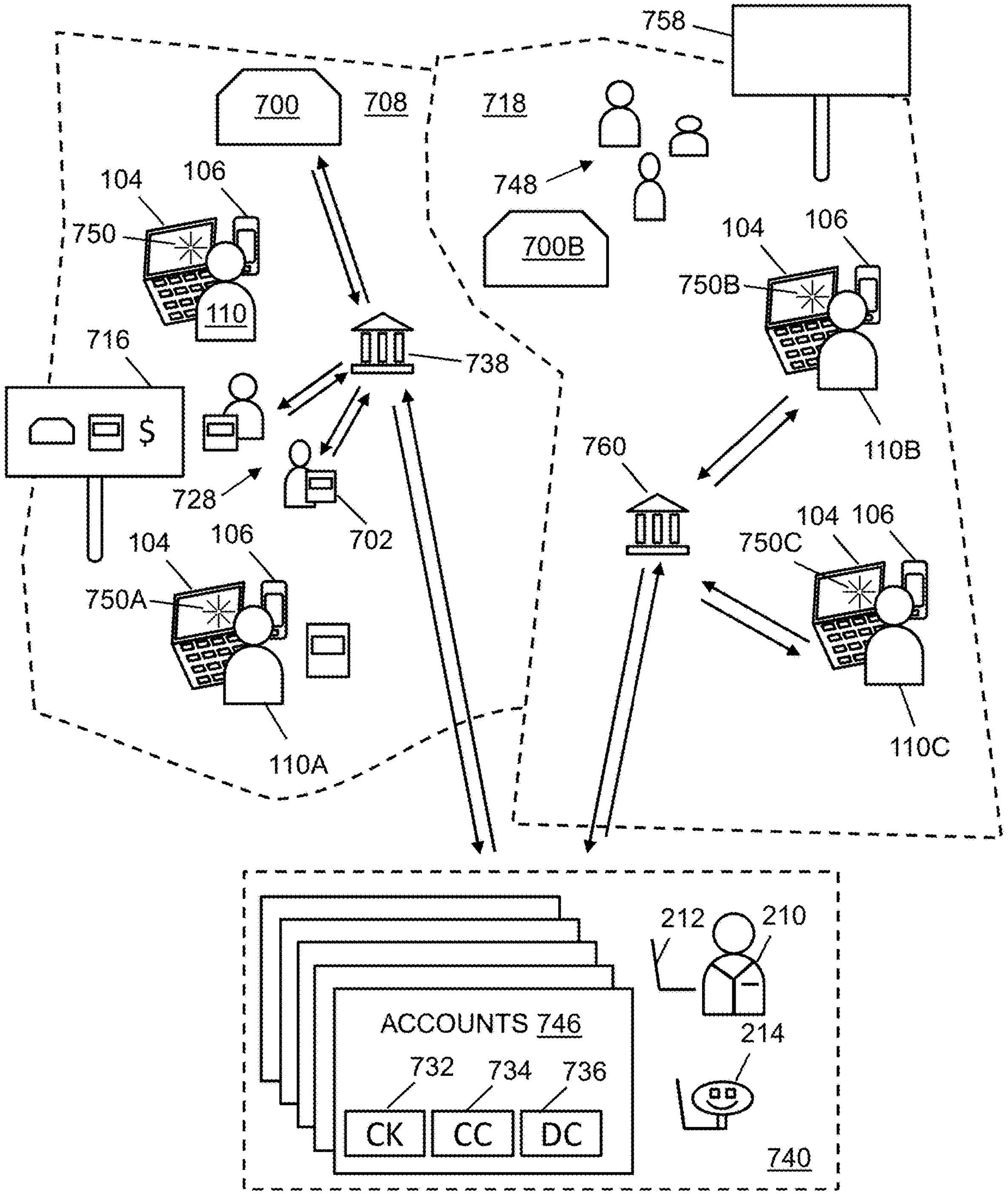

FIG. 8 represents comparative analytics implemented among user entities in location-specific areas.

DETAILED DESCRIPTION OF EMBODIMENTS OF THE INVENTION

Embodiments of the present invention are described herein with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms “coupled,” “fixed,” “attached to,” “communicatively coupled to,” “operatively coupled to,” and the like refer to both (i) direct connecting, coupling, fixing, attaching, communicatively coupling; and (ii) indirect connecting coupling, fixing, attaching, communicatively coupling via one or more intermediate components or features, unless otherwise specified herein. “Communicatively coupled to” and “operatively coupled to” can refer to physically and/or electrically related components.

Embodiments of the present invention described herein, with reference to flowchart illustrations and/or block diagrams of methods or apparatuses (the term “apparatus” includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

FIG. 7 represents an implementation of systems and methods for detecting whether a user-specific georegion-specific metric diverges from a georegion-specific index, and upon detecting such divergence, automatically sending an alert for display at least in part on user device. In the illustrated example, a user entity 110 can be a proprietor, employee, manager, managing group, a corporation, or other interested party with regard to a business 700. The business 700 can offer any number or type of services and products. In some examples, the business 700 offers products 702 as graphically represented in FIG. 7. In other examples, the business offers services. Use of "service(s)" or "product(s)" thus relates to either or both in these descriptions. With regard, for example, to online information and services, "service" and "product" are sometimes termed interchangeably.

The interests, assets, obligations, profits, and liabilities of the business 700 are those of, or are managed at least in part by, the user entity 110. Accordingly, the business 700 and user entity 110 may be termed interchangeably herein. The business 700 may have a "brick and mortar" facility 701 as illustrated in FIG. 7, denoting a business that operates one or more physical facilities where, for example, product fabrication and POS transactions (sales) with customers are conducted or services rendered. Additionally, or alternatively, all variations of which are within the scope of these descriptions, the business 700 may conduct business online or virtually, in whole or in part. For example, the business may conduct order fulfillment without physically stocking and handling products and services, instead purchasing inventory as needed from another party or parties, such as a wholesaler or manufacture, to fulfill orders by shipment directly or indirectly to customers.

The business 700 operates with multiple costs, shown generally throughout FIG. 7 with corresponding indicia (−$). The business has income, for example according to sales of the product 702, shown generally throughout FIG. 7 with corresponding indicia (+$). Customers 728 having purchased product 702 as graphically represented in FIG. 7 can be walk-up customers making POS purchases and can be online purchasers as well, as non-limiting examples. FIG. 7 illustrates, all representing respective costs (−$), incoming material supplies 704, utilities like power 706 and water 710, maintenance and repairs 712, transportation costs 714 with respect to product deliveries, advertising 716, payroll 720 for employees 722, travel reimbursements 724, health insurance premiums and other medical-related expenditures 726, and costs for training or education 730. Each of these expenditures (−$) can be paid via, for example, checks 732 drafted by the user entity, whether checks be in paper form or electronic. The expenditures can be paid by use of credit cards 734, and debit cards 736, and other payment types. These and other transactions can be conducted, for example, online using user devices, represented as a computing device 104 and a mobile device 106 in FIGS. 1 and 7. For a small business in one example, a net profit according to the sum of fetched increments (+$) less the sum of discharged decrements (−$) is essentially income for the proprietor.

According to systems and methods described herein, in at least some embodiments, an entity, referenced as a service entity 740 in FIG. 7, provides a service to the user entity 110 and/or business 700 by use of the enterprise system 200 (FIG. 1) and network 258. For example, by use of the computing system 206, the service entity 740 provides systems and methods for detecting whether a user-specific georegion-specific metric diverges from a georegion-specific index.

The service entity 740 can be described as an enterprise entity, a business entity, a retailer, a merchant entity, a financial institution, a bank, or other service and/or product provider. The service entity 740 can access client data held, acquired, and/or stored for example as described above with reference to the storage device 224 of FIG. 1 and data 234 stored therein. The service entity 740, in some examples, can also utilize available other party data that can be purchased and/or otherwise acquired, for example as described above with reference to the external systems 202 and 204 of FIG. 1.

In the non-limiting example of FIG. 7, timestamped events representing, for example, deposits 742 into and payments 744 made out of accounts 746 of the user entity 110 and/or business 700 are recorded. The expenditures (−$) can be described as quantized output events for which corresponding respective output quantities are decremented from one or more quantized resource of the specific user entity 110, represented by user accounts 746, to satisfy cost-related payments, referring to the satisfaction of outgoing checks, incoming debit card charges, credit card charges, and other payments made by or on behalf of the user entity 110 in covering costs.

The revenues (+$) can be described as quantized input events for which corresponding respective input quantities are fetched from sources for deposit into one or more user account(s) 746. Fetching refers to receiving and crediting cash deposits, and to the satisfaction of deposited or incoming checks from other parties, debit card charges, credit card charges, and other payments made to or exacted by the user entity 110 in receiving payments for products and/or services as non-limiting examples. Thus, a user-entity specific quantized resource, represented by the user account(s) 746, is incremented by the respective input quantity with each input event. For example, revenue (+$) from sales deposited to the one or more user account 746 represent respective quantized input events for which records are stored with regard to the accounts to which corresponding input quantities are fetched.

For each deposit and payment, a corresponding signal is received by some component of the enterprise system 200 indicating a respective incoming quantized input event (deposit, +$) or outgoing quantized output event (payment, −$). The signals are conveyed between user entities, for example between the user entity 110 and the service entity 740, in a bidirectional data stream, via, for example, a network connection 258. From the perspective of the system(s) 200 and/or 206, the increments and decrements made into and out of the user accounts 746 as deposits and withdrawals respectively are driven or prompted by respective incoming received signals.

In various embodiments and implementations, systems and methods described herein are utilized to identify potential revenue generating areas where a user entity may have market access but is not collecting satisfactory revenue through POS transactions or other transactions such as online. A potential customer base in some examples resides, conducts business, or otherwise visits a particular georegion where goods and services are made available by a user entity, but sales of goods and services or other revenue generating or facilitating interactions for that user entity are not strong in the georegion, referring to, as non-exclusive and non-limiting examples, a neighborhood, a city, a county, a state, and a country.

Systems and methods described herein are utilized to determine where a user entity is lagging in market activity or market share, to alert the user entity of underdeveloped or underutilized opportunities, and to inform the user entity where and what markets could be better penetrated with focused activity by the user entity such as advertising. User entity exposure to underperformance by georegion is mitigated by the alert. The alert 750 is advantageous to user entities and user devices, enabling early action to be taken by the user entity. For example, the alert 750 in some examples prompts a user entity to focus promotional activity in specific georegions where their market is not saturated, in lieu of more wide cast advertising even in areas where prior marketing is already effective and customers are already informed or already saturated. Thus, by prompting such focusing, to limited target georegions, data traffic on network connections is reduced, improving network efficiencies, and reducing latencies and operating costs.

Such alerts are generated upon determinations based on data-driven measurements by which a service entity can inform user entities of areas where their clients are coming from based on metrics and indexes. The user entity is thus empowered by information delivered at least by an alert to improve their cash flow. The service entity can provide metrics about incoming cash flow to help the user entity grow their market share and associated income by focusing in one or more particular georegion. For example, a restauranteer may be enabled to reallocate solicitation efforts and resources from an area where they already have a high penetration to another area where they have a lower penetration. For example, a user entity can be informed of an area where people are available as customer but aren't coming to their business for POS sales or other transactions such as by online purchases.

The benefits and advantages of the systems and methods can be applied to or utilized by user entities have POS fixed locations as already described or implied. In other examples, the user entity may be mobile or traveling, for example providing a home cleaning service or operating a mobile business. Such a user entity is enabled by alerts described herein of what areas to visit or where to focus their presence overall or in particular time frames such as certain days. Such advantages can help them with their operating costs and logistics. Because revenue records are timestamped, data analysis is applied in some examples to determine whether time-of-day specific and day-of-week specific sales are satisfactory or when they can improve by georegion. For example, a user entity can be alerted that rush hour commuters are traveling near their POS business but sales are not being accordingly made by the user entity.

In some examples, a computing system of the service entity 740 uses artificial intelligence (AI) on transactions in the business accounts of small business clients. The user entity 110 may be a client of the service entity 740. The service entity 740 may maintain, oversee, manage and or monitor the accounts 746, representing any and/or all of accounts for and/or related to checking, savings, investments, credit cards, automatic-teller machines, debit cards, loans, mortgages, personal accounts, and business accounts as non-limiting examples.

Notifications such as the alert 750 may be made by way of a communication application, for example referenced as application 132 in FIG. 1, provided by the service entity 740 and installed on the one or more user device 104 and 106. Clients may be segmented into different categories such as retail banking clients, premier banking clients, wealth clients, small business clients, and commercial clients. Communication to each would look different depending on the type of client and their selected or inferred preferences. Small business and sole proprietors are likely among those to find significant benefits in the various services described herein.

The alert 750 and accompanying or subsequent information and messaging can be customized for each particular user entity or user category. A human agent 210, and/or a virtual agent 214, may be engaged in communications preceding, accompanying, or subsequent to the alert 750. The user entity 110 may conduct transactions via the one or more user devices 104 and 106 and may visit a branch office of the service entity 740 and conduct transactions at a kiosk or counter. A human agent 210, and/or a virtual agent 214 may be informed with user preferences as to greetings and with awareness of what stage the user entity may be at with regard to the alert 750.

The above-described benefits and advantages are provided in various embodiments of the enterprise system 200 of FIG. 1, which can be described as a system for monitoring quantized signals in a bidirectional data stream and alerting a networked device of metric divergence by georegion. The system 200 includes a computing system 206 having one or more processor 220 and at least one of a memory device 222 and a non-transitory storage device 224. The one or more processor executes computer-readable instructions 226, and a network connection 258 operatively connecting user devices 104 and 106 to the computing system. Upon execution of the computer-readable instructions, the computing system performs steps for each specific user entity 110 of multiple user entities.

The steps, in various embodiments of the system 200, include: receiving input event signals and storing corresponding input event records associated with the specific user entity, each of the input event records representing a respective quantized input event; and incrementing, for at least some of the input event records, one or more quantized resource of the specific user entity by a respective input quantity. In FIG. 7, the revenues (+$) represent quantized input events for which corresponding input quantities are fetched from sources for deposit into one or more user account 746, for which records are stored with regard to the accounts to which the input quantities are fetched.

The steps can further include: receiving output event signals and storing corresponding output event records associated with the specific user entity, each of the output event records representing a respective quantized output event; and decrementing, for at least some of the output event records, a respective output quantity from the one or more resource of the specific user entity. In FIG. 7, the expenditures (−$) represent quantized output events for which corresponding respective output quantities are discharged or decremented from one or more user account 746, for which records are stored with regard to the accounts from which corresponding output quantities are decremented.

The computing system 206, in some examples, can implement discriminating, for at least some of the input event records, a respective at least one georegion-specific attribute associated with a respective georegion. Georegion-specific attributes serve to identify payments made for georegion areas and are useful in determining whether a particular user entity is conducting business in a georegion. For example, electronically conducted payments such as via credit cards, debit cards, and transfers are incremented into an account of the user entity from customer accounts, client accounts, or other-entity accounts for which primary addresses or contact addresses are available or can be acquired. Thus, account data for accounts from which payments are made to the user entity 110 in some examples have georegion-specific attributes such as associated addresses.

In some examples, the user entity 110 may have multiple point of sale POS locations of which records of the service entity 740 are effectively aware. In such examples, as input event signals are received for which input event records are stored, each is associated with a particular georegion according to the POS geolocation where the transaction was made. Thus, account data for accounts into which payments are made to the user entity 110 in some examples, and transaction data for incoming revenue (+$) have georegion-specific attributes.

Revenues referenced as (+$) in FIG. 7 can be identified by the identities of the providers of the payments, thus provider accounts can serve as georegion-specific attributes. Other attributes can be found in the keywords present in websites, metadata, tags, or other available content sources regarding the products and/or services made available by the user entity 110. For example, online sales via a website of the user entity 110 may be associated with physical locations where website visitors permit sharing of their location during an online interaction. Incoming input signals that are generated at, or associated with, a discernible geolocation within a georegion are discriminated according to the discerned geolocation as having a corresponding georegion-specific attribute.

These examples of georegion-specific attributes, generally referring to indicators by which specific locations are identified, are within the scope of these descriptions. A georegion according to these descriptions can refer to a neighborhood, a city, a county, a state, and a country, as non-limiting examples.

In at least one embodiment of systems and methods described herein, a discriminating algorithm is trained by a machine-learning technique and used to discriminate output georegion-specific attributes. The machine-learning technique may utilize input event records of multiple user-entities, for example from one or more previous time period, to train the discriminating algorithm to discriminate georegion-specific attributes.

The computing system 206 can associate each input event record, for which a respective at least one georegion-specific attribute is discriminated, with the respective georegion. Thus, georegion-specific payment (+$) records can be later identified to determine whether, for example, a user entity having goods or services in a particular area is collecting satisfactory revenue through POS transactions or other transactions such as online, and to identify potential revenue generating areas where the user entity can increase presence.

The computing system 206 can measure, over a time interval, for each georegion with which input event records of the specific user-entity are associated, a user-specific georegion-specific metric. The user-specific georegion-specific metric represents user revenues in a particular region, and quantitatively indicates market share, market success, and/or other positive business engagement by region. The user-specific georegion-specific metric represents, for the user entity, for example, in the particular time interval, revenue and positive transactions as a total, or as a computed quantity by which the positive transactions (+$) of the user entity in a georegion can be compared, for example, with georegion-specific metrics of the same user in other georegions and/or with the metrics of other user entities across one or more georegions.

The computing system 206 can further determine, for each georegion for which a user-specific georegion-specific metric is measured, whether the user-specific georegion-specific metric diverges from a georegion-specific index. The georegion-specific index may include or represent an average, a mean, a normalized sum, and/or a weighted sum, as non-limiting examples. The georegion-specific index represents, in some examples, peer revenues in a particular georegion, and can serve as a basis by which a determination as to whether a user entity is getting a market share of business and/or income in proportion to advertising costs or presence.

In other examples, the georegion-specific index represents a quantitative basis for determining whether advertising, presence, or costs of a user entity in one georegion, in proportion to sales volume and revenues of that user entity in that georegion, is in balance with that of other georegions where the user entity conducts business.

In some examples, the user-specific georegion-specific metric represents net revenue, a net profit calculation for a specific georegion and time interval according to the sum of fetched increments (+$) less the sum of discharged decrements (−$). In at least some such examples, the georegion-specific index represents a set value predetermined by the user entity representing desired net profit for the georegion. The term "represents" is used broadly herein referring to, for example, direct values for comparison, and/or to proportionalized or normalized values for comparison. For example, a user-specific georegion-specific metric taking time spent by the user entity into consideration by proportion in relation to revenues can be described as representing a net profit calculation.

The computing system 206 sends an alert, referenced for example in FIG. 7 as alert 750, across the network connection 258 for display at least in part on at least one user device associated with the specific user entity 110 upon determining the user-specific georegion-specific metric diverges from the georegion-specific index. User device refers to the computing device 104 and/or the mobile device 106 and/or any other devices available or accessible to the user entity. The alert 750, in various examples, indicates that the user-specific georegion-specific metric diverges from the georegion-specific index by subceeding the georegion-specific index. In at least one example, the alert 750 notifies the user entity 110 of underperformance with regard to sales in a specific georegion. Underperformance refers in some examples to lagging sales in that georegion relative to expectations of the user entity, relative to performance in other georegions where the user entity 110 conducts business, and/or relative to performance of peers in similar or same industry businesses.

The georegion-specific index may be determined by the computing system, in whole or in part, from the transactional data available from the multiple user entities which records are stored by the service entity. The computing system can aggregate data and accumulate or calculate the index over time, for any given time interval, using records of multiple user-entities. Other data may be available data may be used in lieu of or in combination with the transactional data available from the multiple user entities for which records are stored by the service entity. Industry-reported or published data may be made available such that for example, published peer-representative averages and indexes may be used to supplement user data. Thus, the computing system can access and utilize third-party data in determining the georegion-specific index, which may be peer-representative.

In at least some examples, the computing system 206 aggregates over time the georegion-specific index using an aggregating algorithm trained by a machine-learning technique, for example as represented in FIG. 6. In at least one example, the machine-learning technique utilizes records, of multiple user entities, from prior time intervals to calculate a peer-representative index. Records of multiple time periods may be used in order to implement normalization against spurious market increases and decreases.

A trained model, in at least one embodiment, is built using historical data of the user entity and that of other user entities. In the example of FIG. 7, in which user entity exposure to underperformance by georegion is mitigated by the alert 750, model training can be implemented in FIG. 6 utilizing data from multiple user entities to train a model by which user spending and revenues in multiple output categories can be compared to respective peer-representative amounts. The machine-learning technique can be applied to any of the simulated neural network architectures described here with reference to FIGS. 2A-5 for implementation in calculations described with reference to FIG. 7.

The user-specific georegion-specific metric and the georegion-specific index in some examples are matched with regard to geolocation to implement a tailored and meaningful divergence determination by which user entity exposure to underperformance by georegion is mitigated by the alert. For example, as represented in FIG. 8, the business 700 of a user entity 110 has a physical location in a particular geographical area 708, bounded by dashed line in FIG. 8 for illustration. The area 708 can represent a neighborhood, a city, a county, a state, and a country, as non-limiting examples. Comparative analytics can be implemented among user entity businesses 700 in georegion 708, and user entity business 700B in georegion 718.

Customers 728 having purchased product 702 as graphically represented in FIG. 8 can be walk-up customers making POS purchases, can be online purchasers, and can be other purchasers as well, according to non-limiting examples. In the example of FIG. 8, sales are satisfactory and may be responding to area-specific advertising 716, which represents, as non-limiting examples, physical signage, airwaves advertising such as radio and television commercials, neighborhood canvasing, flyers distribution, area-targeted texting and voicemail advertising, online advertising through social media and other web-based forums and venues, and electronic advertising forms directed to user devices.

Online advertising, online marketing, Internet advertising, digital advertising and/or web advertising, represent a form of marketing and advertising using, for example, the Internet to promote products and services to audiences and platform users. Online advertising includes email marketing, search engine marketing (SEM), social media marketing, and many types of display advertising (including web banner advertising), and mobile advertising. Advertisements can be delivered via automated software systems operating across multiple websites, media services and platforms, known as programmatic advertising. Like area-specific physical signage advertising, online advertising and other electronic advertising can be area-targeted to user devices of users having consented to sharing their location and/or users having known or accessible addresses. For example, electronically conducted payments such as via credit cards, debit cards, and transfers are incremented into an account of the user entity from customer accounts, client accounts, or other-entity accounts for which primary addresses or contact addresses are available or can be acquired.

User entities 110 and 110A, via their respective user devices, receive respective alerts 750 and 750A upon a computing system of the service entity 740 determining respective the user-specific georegion-specific metrics diverge from one or more respective georegion-specific index. For example, underperformance occurs with regard to sales to customers 748 in georegion 718. In the example of FIG. 8, sales are unsatisfactory and may reflect a lack or insufficient area-specific advertising 758, referring to all advertising modes described expressly with reference to advertising 716, and to be inferred in view of the descriptions herein of area-specific advertising 716.

Thus, where the user entities 110 and 110A are lagging in market activity or market share, they are alerted of underdeveloped or underutilized opportunities, and informed of what markets could be better penetrated with focused activity by the user entity such as advertising. User entity exposure to underperformance by georegion is thus mitigated by the alerts 750 and 750A. The alerts 750 and 750A is advantageous to user entities and user devices, enabling early action to be taken by the user entity.

Improvements described herein effect the narrowing of messaging audiences to specific georegions thus reducing network traffic by minimizing messaging redundancies particularly where area-specific advertising is conducted electronically and targeted to user devices according to area-specific attributes. Data traffic on network connections is thereby reduced, improving network efficiencies, and reducing latencies and operating costs. This improves networks, their use, and the effective use of networked devices, including smart phones, and other computerized devices.

In FIG. 8, at least some examples, comparative analytics are implemented among user entity businesses 700 and 700B in respective the georegions 718 for alerting the user entities 110, 110A, 110B and 110C, each by way of the respective alerts 750, 750A, 750B and 750C. Each is thus alerted of underperformance occurring with regard to sales to potential customers 748 in georegion 718.

FIG. 8 also represents that the user entity 110 representing or represented by the business 700 in the area 708 may conduct transactions via respective one or more user device and may visit a nearby branch office 738 of the service entity 740 and conduct transactions at a kiosk or counter. Similarly, a user entity 110B representing or represented by the businesses 700B in the area 718 may conduct transactions via respective one or more user device and may visit a nearby branch office 760 of the service entity 740 and conduct transactions at a kiosk or counter.

In some examples, user entities have primacy, referring to the service entity 740 being primary in handling financial flows and transactional data. In such cases, the service entity 740 has direct access to transactional data for credit transactions, checking transactions, and other transaction types. More detailed information from checking transactions than incoming and outgoing amounts can be gained from ingesting data via OCR analysis on checks, whether in paper or scanned form. For example, a peer-representative georegion-specific index can be aggregated by the service entity 740 from revenue records of multiple business-category specific businesses for comparison to a georegion-specific metric representing the revenue of a specific user entity 110, and the alert 750 is sent when the metric subceeds the index.

Comparative analytics can be conducted among user entities in a common industry, such as restaurants, convenience stores, landscaping companies, beauty salons, barbers, car repairs, as non-limiting examples. Comparative analytics can be conducted among user entities in a common location area, such as a neighborhood, a city, a county, a state, and a country, as non-limiting examples.

Information reported to user entities resulting from the analysis may be free of identifying information from other entities to preserve confidential information and expectations of data privacy. The service entity 740 may provide the aggregate of multi-entity transactions and determine a mean, or an average of categorized transactions across a peer-group or a number of entities in a common industry, and error rates or statistical deviations can be determined. The service entity 740 may normalize the data. For example, if sizable margins of error are seen in one industry or another, normalization can be applied.

Time intervals for sampling and reporting/alerting can vary to provide real time feedback or near real time feedback. Industry-reported or published data may be made available in a delayed fashion, such that for example, published peer-representative averages and indexes may be a year old by the time data is accumulated and made available via conventional means. Systems and methods described herein can provide user entities with more timely information, especially for example when peer data is immediately available to the service entity 740 through primacy of multiple user entities in common industries and areas.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for monitoring quantized signals and alerting a networked device of metric divergence by georegion, the system comprising:

a computing system of a first entity including one or more processor and at least one of a memory device and a non-transitory storage device, wherein said one or more processor executes computer-readable instructions; and a network connection operatively connecting user devices to the computing system, wherein, upon execution of the computer-readable instructions, the computing system performs steps comprising, for each specific user entity of multiple user entities:

receiving input event signals and storing corresponding input event records associated with the specific user entity, each of the input event records representing a respective quantized input event;

incrementing, respectively for each one of at least some of the input event records, a quantized resource in an account of the specific user entity by a respective input quantity;

receiving by the first entity into the quantized resource in the account of the specific user entity the respective input quantity by deposit or by payment;

receiving output event signals and storing corresponding output event records associated with the specific user entity, each of the output event records representing a respective quantized output event;

decrementing, respectively for each one of at least some of the output event records, a respective output quantity from the quantized resource in the account of the specific user entity;

discharging by the first entity the respective out quantity from the quantized resource in the account of the specific user entity;

discriminating, for at least some of the input event records, a respective at least one georegion-specific attribute associated with a respective georegion;

associating each input event record, for which a respective at least one georegion-specific attribute is discriminated, with the respective georegion;

measuring, over each georegion with which at least one of the input event records of the user entity and output event records of the user entity are associated, a user-specific georegion-specific metric;

determining, for each georegion for which a user-specific georegion-specific metric is measured, whether the user-specific georegion-specific metric diverges from a georegion-specific index; and automatically sending an alert across the network connection to at least one user device associated with the specific user entity for display at least in part on the at least one user device associated with the specific user entity upon determining the user-specific georegion-specific metric diverges from the georegion-specific index, the alert comprising an indication to the specific user entity that the user-specific georegion-specific metric diverges from the georegion-specific index, wherein the georegion-specific index is representative of at least one of input event records of the multiple user entities, and output event records of the multiple user entities.

2. The system of claim 1, the steps further comprising aggregating, for at least one georegion with which at least one of input event records of the user entity and output event records of the user entity are associated, the georegion-specific index.

3. The system of claim 2, wherein aggregating the georegion-specific index comprises using an aggregating algorithm trained by a machine-learning technique.

4. The system of claim 3, wherein the aggregating algorithm aggregates the georegion-specific index from at least one of input event records of the multiple user entities and output event records of the multiple user entities.

5. The system of claim 4, wherein the machine-learning technique utilizes records of the multiple user entities such that the georegion-specific index is at least in part peer representative.

6. The system of claim 1, wherein discriminating the respective at least one georegion-specific attribute comprises using a discriminating algorithm trained by a machine-learning technique.

7. The system of claim 6, wherein the machine-learning technique utilizes at least one of input event records of the multiple user entities and output event records of the multiple user entities to train the discriminating algorithm to discriminate georegion-specific attributes.

8. The system of claim 6, wherein the machine-learning technique utilizes at least one of input event records of the specific user entity and output event records of the specific user entity to train the discriminating algorithm to discriminate georegion-specific attributes.

9. The system of claim 1, wherein the georegion-specific index represents at least one of: an average; a mean; a normalized sum; and a weighted sum.

10. The system of claim 1, the steps further comprising determining the georegion-specific index at least in part using third-party data.

11. The system of claim 1, wherein the user-specific georegion-specific metric represents at least one of: an average; a mean; a normalized sum; and a weighted sum.

12. The system of claim 1, wherein the alert comprises an indication that the user-specific georegion-specific metric diverges from the georegion-specific index by subceeding or exceeding the georegion-specific index.

13. The system of claim 1, wherein the georegion-specific index is representative of at least one of:

timestamped input event records of the multiple user entities within a first time interval; and timestamped output event records of the multiple user entities within the first time interval.

14. The system of claim 1, wherein the georegion-specific index is representative of timestamped input event records and output event records of multiple other user entities of the multiple user entities within a time interval.

15. The system of claim 1, wherein each said quantized input event represents at least one of a cash deposit, an incoming check from another party, a debit card charge made to or exacted by the specific user entity, and a credit card charge made to or exacted by the specific user entity.

16. The system of claim 1, wherein the georegion-specific index is representative of revenue of the multiple user entities made within at least one of a neighborhood, a city, a county, a state, and a country.

17. The system of claim 1, wherein the georegion-specific index is representative of peer revenues in a particular georegion.

18. The system of claim 1, wherein the georegion-specific index is representative of revenues in a particular georegion of peers within a common business category.

19. A method for a first entity computing system to monitor quantized signals and alert a networked device of metric divergence by georegion, the first entity computing system including one or more processor and at least one of a memory device and a non-transitory storage device, the one or more processor configured to execute computer-readable instructions, the method comprising, upon execution of the computer-readable instructions, for each specific user entity of multiple user entities:

receiving input event signals and storing corresponding input event records associated with the specific user entity, each of the input event records representing a respective quantized input event;

incrementing, respectively for each one of at least some of the input event records, a quantized resource in an account of the specific user entity by a respective input quantity;

receiving by the first entity into the quantized resource in the account of the specific user entity the respective input quantity by deposit or by payment;

receiving output event signals and storing corresponding output event records associated with the specific user entity, each of the output event records representing a respective quantized output event;

decrementing, respectively for each one of at least some of the output event records, a respective output quantity from the quantized resource in the account of the specific user entity;

discharging by the first entity the respective out quantity from the quantized resource in the account of the specific user entity;

discriminating, for at least some of the input event records, a respective at least one georegion-specific attribute associated with a respective georegion;

associating each input event record, for which a respective at least one georegion-specific attribute is discriminated, with the respective georegion;

measuring, over each georegion with which at least one of the input event records of the user entity and output event records of the user entity are associated, a user-specific georegion-specific metric;

determining, for each georegion for which a user-specific georegion-specific metric is measured, whether the user-specific georegion-specific metric diverges from a georegion-specific index; and automatically sending an alert across the network connection to at least one user device associated with the specific user entity for display at least in part on the at least one user device associated with the specific user entity upon determining the user-specific georegion-specific metric diverges from the georegion-specific index, the alert comprising an indication to the specific user entity that the user-specific georegion-specific metric diverges from the georegion-specific index, wherein the georegion-specific index is representative of at least one of input event records of the multiple user entities, and output event records of the multiple user entities.

20. A non-transient computer-readable medium having instructions recorded thereon, wherein the instructions when read by at least one processor of a computer system cause the computer system to implement a method comprising the steps of:

receiving input event signals and storing corresponding input event records associated with the specific user entity, each of the input event records representing a respective quantized input event;

incrementing, respectively for each one of at least some of the input event records, a quantized resource in an account of the specific user entity by a respective input quantity;

receiving by the first entity into the quantized resource in the account of the specific user entity the respective input quantity by deposit or by payment;

receiving output event signals and storing corresponding output event records associated with the specific user entity, each of the output event records representing a respective quantized output event;

decrementing, respectively for each one of at least some of the output event records, a respective output quantity from the quantized resource in the account of the specific user entity;

discharging by the first entity the respective out quantity from the quantized resource in the account of the specific user entity;

discriminating, for at least some of the input event records, a respective at least one georegion-specific attribute associated with a respective georegion;

associating each input event record, for which a respective at least one georegion-specific attribute is discriminated, with the respective georegion;

measuring, over each georegion with which at least one of the input event records of the user entity and output event records of the user entity are associated, a user-specific georegion-specific metric;

determining, for each georegion for which a user-specific georegion-specific metric is measured, whether the user-specific georegion-specific metric diverges from a georegion-specific index; and automatically sending an alert across the network connection to at least one user device associated with the specific user entity for display at least in part on the at least one user device associated with the specific user entity upon determining the user-specific georegion-specific metric diverges from the georegion-specific index, the alert comprising an indication to the specific user entity that the user-specific georegion-specific metric diverges from the georegion-specific index, wherein the georegion-specific index is representative of at least one of input event records of the multiple user entities, and output event records of the multiple user entities.

* * * * *